(12) United States Patent
Ward

(10) Patent No.: US 8,018,697 B2
(45) Date of Patent: Sep. 13, 2011

(54) GROUND FAULT PROTECTION CIRCUIT

(75) Inventor: Patrick Ward, Ballinasloe (IE)

(73) Assignee: Shakira, Limited, Ballinasloe (IE)

( * ) Notice: Subject to any disclaimer, the term of this patent is extended or adjusted under 35 U.S.C. 154(b) by 358 days.

(21) Appl. No.: 12/226,058

(22) PCT Filed: Feb. 7, 2007

(86) PCT No.: PCT/EP2007/001158
§ 371 (c)(1),
(2), (4) Date: Oct. 7, 2008

(87) PCT Pub. No.: WO2007/144032
PCT Pub. Date: Dec. 21, 2007

(65) Prior Publication Data
US 2009/0244794 A1   Oct. 1, 2009

(30) Foreign Application Priority Data
Jun. 15, 2006  (IE) .................................... S2006/0453

(51) Int. Cl.
*H02H 3/00*  (2006.01)
*H02H 9/08*  (2006.01)
(52) U.S. Cl. ................ 361/42; 361/43; 361/44; 361/45; 361/46; 361/47; 361/48; 361/49

(58) Field of Classification Search ..................... 361/42
See application file for complete search history.

(56) References Cited

U.S. PATENT DOCUMENTS

| 3,265,933 | A  |   | 8/1966  | Perry et al. |
| 3,732,463 | A  | * | 5/1973  | Dale .............................. 361/45 |
| 6,128,169 | A  | * | 10/2000 | Neiger et al. .................... 361/42 |
| 6,807,035 | B1 |   | 10/2004 | Baldwin et al. |
| 2003/0235017 | A1 | | 12/2003 | Liu |

FOREIGN PATENT DOCUMENTS

EP  0 590 687 A1  4/1994

* cited by examiner

*Primary Examiner* — Dharti H Patel
(74) *Attorney, Agent, or Firm* — The Nath Law Group; Jerald L. Meyer; Jiaxiao Zhang

(57) ABSTRACT

A switching circuit, e.g. an RCD, comprises a pair of mechanical contacts (M) in an alternating current electricity supply (N, L) and circuit means (SCR) for opening the contacts to cut off the supply in response to a switching signal (S). The switching circuit includes further circuit means (Rs, Cs, D2, D3, Q1, Q2) for defining successive periods of time ("activation windows") during which the magnitude of the supply voltage is not at a maximum and allowing the contacts to open in response to a switching signal only during such windows.

4 Claims, 5 Drawing Sheets

GROUND FAULT PROTECTION CIRCUIT

This invention relates to a switching circuit comprising at least one pair of mechanical contacts in an alternating current electricity supply and means for changing the state of the contacts (i.e. opening or closing them) in response to a switching signal. The invention is applicable, but not limited, to residual current devices (RCDs).

RCDs are used for providing protection against electric shock and dangerous ground fault currents in an alternating mains supply. Most of these use an electronic circuit for detecting an earth fault current and causing the RCD to trip if the earth fault current exceeds a certain threshold for a certain period of time. RCDs are often fitted in socket outlets (receptacles), plugs and adaptors, and in most of these applications available space and cost are critical parameters. However, regardless of size and cost constraints, the RCD must be able to perform its required functions in a consistent and reliable manner.

Under a fault condition, the RCD will open one or more mechanical contacts in the main supply to disconnect the supply from the load. One problem encountered by all such devices is the need to ensure that the contacts are suitably rated for the maximum earth fault current that is expected to flow in the circuit being protected. Depending on the particular application, this fault current could be in the hundreds or even thousands of amperes range and the contacts must be suitably rated to break the fault current at full mains voltage. The opening operation can give rise to substantial arcing, heat and resultant carbon debris within the RCD, and provision must be made for the RCD to adequately withstand these stresses. Typical solutions are to provide large contacts, contacts with low arcing properties, high speed opening action, maximising contact gaps and fitting arc suppression or arc quenching means, all of which add to cost, size and complexity.

Arcing also occurs when contacts close, so that similar problems arise.

It is an object of the invention to provide a switching device which mitigates the above disadvantages and which can be manufactured in a simple and cost effective manner.

According to the present invention there is provided a switching circuit comprising at least one pair of mechanical contacts in an alternating current electricity supply and means for changing the state of the contacts in response to a switching signal, the circuit further including means for defining successive periods of time ("activation windows") during which the magnitude of the supply voltage is not at a maximum and allowing the contacts to change state in response to a switching signal only during such windows.

In an embodiment of the invention the switching circuit includes a solid state switching device which is turned on in response to a switching signal of a given voltage level applied at a control terminal of the switching device, wherein the means for defining the activation windows comprises means for holding the control terminal to a voltage other than the given voltage level outside the activation windows, and wherein the contacts change state in response to the switching device being turned on.

In such embodiment the means for holding the control terminal to a voltage other than said given voltage level comprises a further solid state switching device connected between the control terminal and the voltage other than the given voltage, the further switching device being turned on outside the activation windows.

Preferably the activation windows are defined by a signal derived by phase shifting the mains voltage.

In one application of the invention the switching circuit is an RCD and the switching signal is produced in response to an earth fault current.

Embodiments of the invention will now be described, by way of example, with reference to the accompanying drawings, in which.

Figure 1:
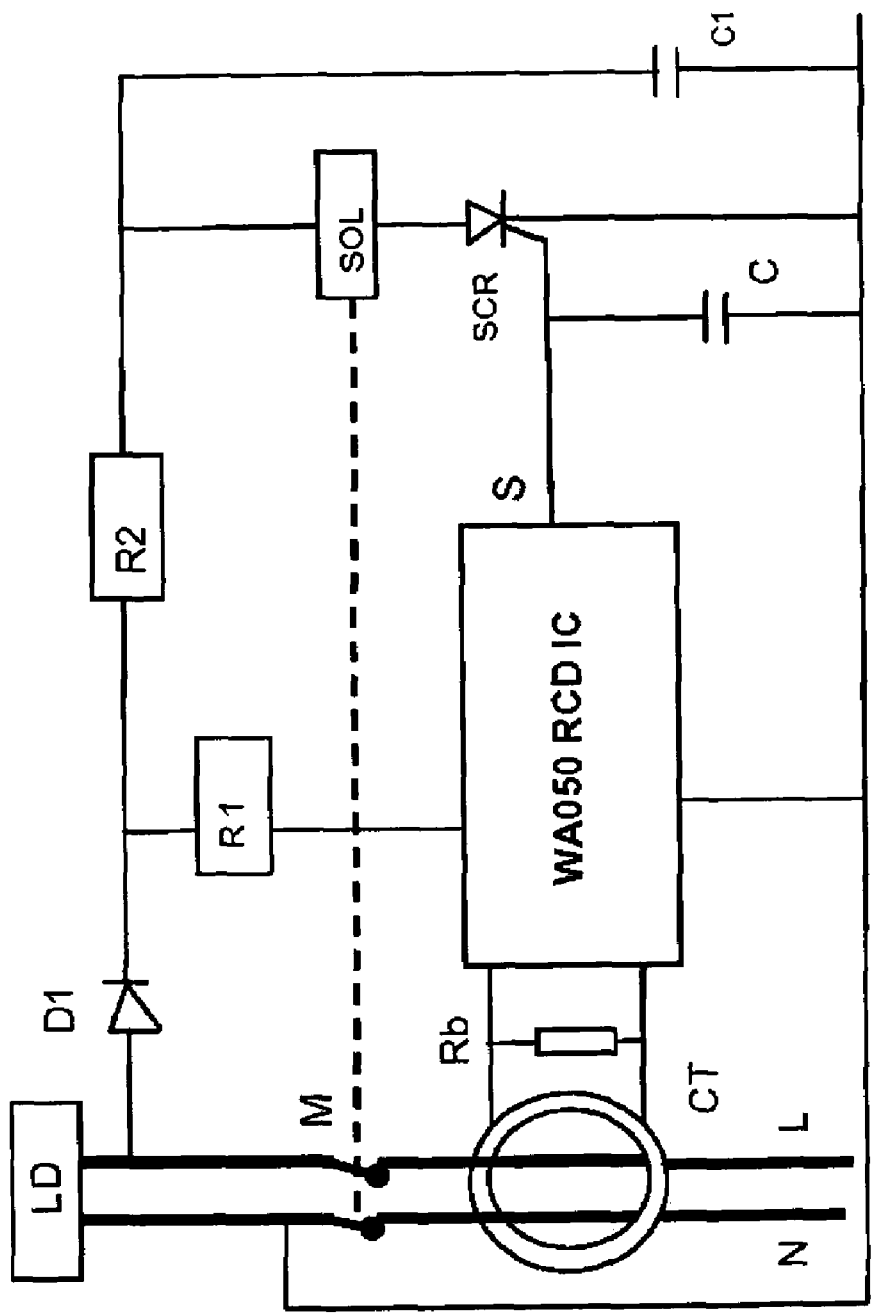
FIG. 1 shows a typical prior art RCD circuit.

The prior art circuit of FIG. 1 comprises a mains supply to a load LD. The mains conductors, in the present case comprising live L and neutral N conductors, pass through a current transformer CT. There are two, normally closed mechanical contacts M in the mains supply, one in each of the conductors L, N. An electronic circuit is connected to the mains supply via a diode D1, the electronic circuit comprising an integrated circuit (IC) type WA050 powered via a resistor R1 and a capacitor C1 acquiring a charge via a resistor R2. The WA050 is an industry standard RCD IC supplied by Western Automation Research & Development Ltd, Ireland.

Under normal conditions, the current flowing in the live L and neutral N conductors is of equal magnitude, but the current flows in opposite directions within each conductor as it passes through the CT, with the result that the CT does not see any net current flow. In the event of an earth fault on the load side of the CT, some of the current flowing in the live conductor L will pass to earth and not return via the neutral conductor N. In this case the live and neutral currents will no longer be of equal magnitude and the CT will produce a resultant output. This output will be sensed by the WA050 IC, and if the magnitude and duration of flow of the earth fault current exceeds certain predetermined limits the output S of the WA050 IC will go high to produce a switching signal for a silicon controlled rectifier SCR, turning the SCR on. When the SCR turns on, the capacitor C1 will discharge through a solenoid SOL, thereby activating the solenoid and causing it to automatically open the mechanical contacts M. Resistor Rb sets the threshold of residual current at or above which the WA050 IC output goes high to turn on the SCR. This threshold can be varied by changing the value of Rb. Capacitor C provides a degree of suppression for the SCR gate to minimise the risk of the SCR turning on due to noise, etc. Such RCD circuits are very well known and do not require further description here.

Figure 2:
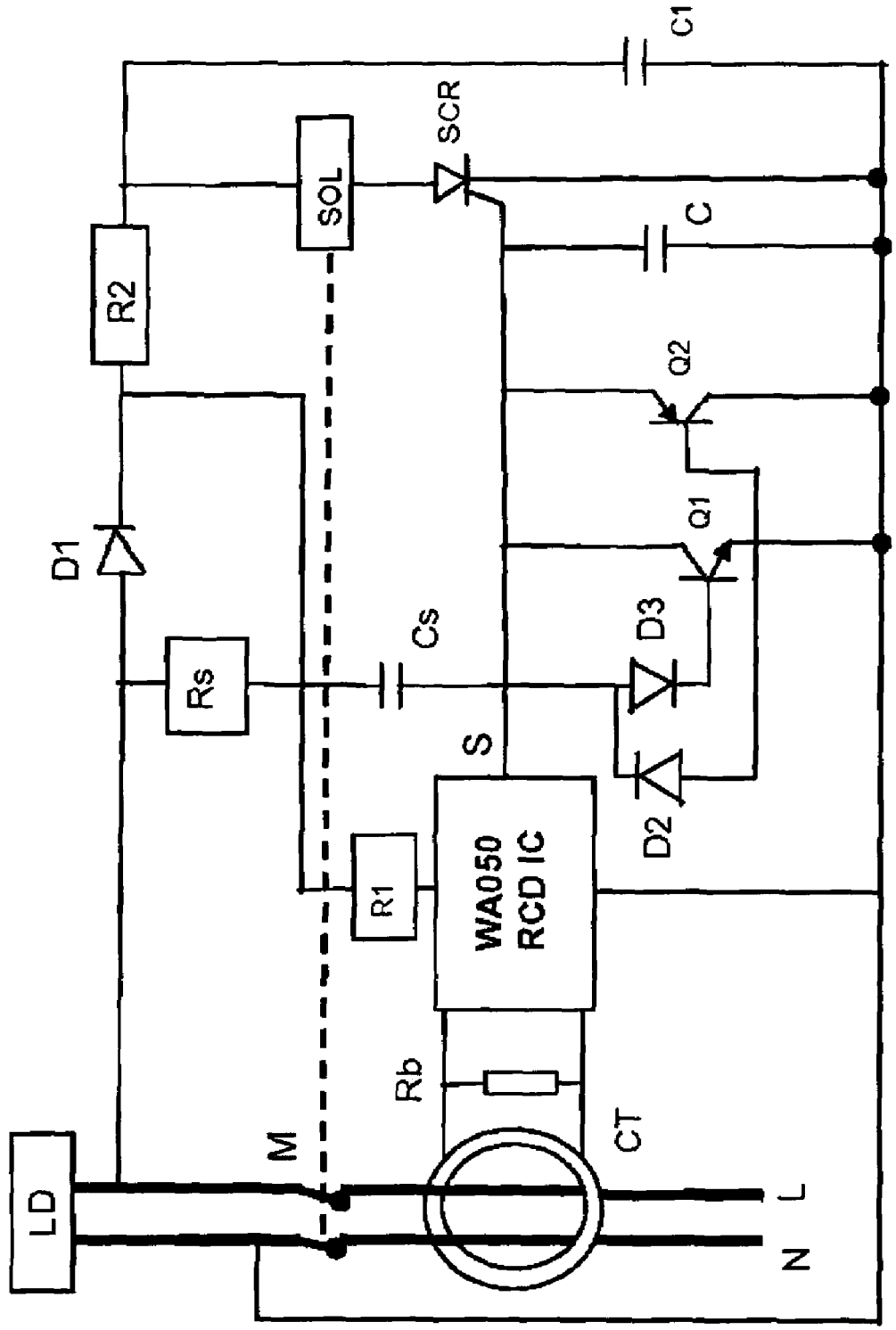
FIG. 2 shows an RCD circuit according to a first embodiment of the invention.

The point on wave (POW) of the AC mains voltage at which the contacts open will be completely random under the above arrangement. For a resistive fault condition, the fault current will be a maximum at the peak of the AC voltage wave and will be lower at other points. If the contacts open at the peak, they will have to break maximum current at maximum voltage and therefore have to withstand maximum energy, but in addition, the resultant arcing, heat and carbon debris will also be maximised. If the contacts open at a voltage below the peak of the wave, the breaking current will be less, and arcing, heat and debris will also be reduced. It would therefore be advantageous if arrangements could be made to ensure that the contacts only open at voltages substantially less than the peak supply voltage and thereby ameliorate the above problems. FIG. 2 shows such an arrangement.

FIG. 2 differs from FIG. 1 in that it has six additional components, resistor Rs, capacitor Cs, diodes D2 and D3, and npn and pnp transistors Q1 and Q2 respectively.

Disregarding capacitor Cs initially, Q1 will be turned on via D3 whenever the mains cycle is positive, and Q2 will be turned on via D2 whenever the mains cycle is negative. As a result, the gate of the SCR will be held low at virtually all times even if a fault current is detected, and it will not be possible to turn on the SCR and energise the solenoid by a switching signal at the output S of the IC.

However, adding capacitor Cs causes a phase shift between the mains supply voltage and the current flowing into diodes D2 and D3. It is well known that when an AC voltage is applied to a capacitor the current flow through the capacitor will be advanced by up to 90 degrees such that when the voltage is at its peak the current is at a minimum, and vice versa. Disregarding Rs for the moment, it follows that when the AC supply voltage is at its peak level, either positive or negative, there will be zero current flow in D1 and D2 with the result that Q1 and Q2 will both be turned off. A switching signal would then be able to appear on the output S of the IC to turn on the SCR and the contacts M would open at the peak AC supply voltage. The combination of Rs and Cs has the effect of causing the current flow in D2 and D3 to lead the mains supply voltage by some angle between zero and 90 degrees. By a suitable selection of these resistor and capacitor values, the amount by which the current leads the voltage can be precisely set. Assuming that Rs and Cs values have been chosen to provide a 10 degrees phase shift, and considering the positive half cycle of the mains supply initially, it follows that when the mains voltage starts to rise from zero the current will already be at some higher value with the result that D3 will conduct and turn on Q1 before the mains voltage rises substantially above zero volts. As long as Q1 is turned on, the SCR cannot be turned on. As the positive cycle progresses the current will finally start to fall towards zero level at which stage D3 will cease to conduct and Q1 will turn off. At this point the mains voltage will be at a voltage greater than zero volts and if the IC output S goes high the SCR will be able to turn on and cause the contacts M to open, albeit at a relatively low voltage and a voltage that is falling towards zero volts.

For the same component values and phase shift and considering the negative half cycle of the mains supply, it can be seen that when the voltage amplitude is zero the current through D2 will be at some higher value with the result that Q2 will be turned on and the SCR will be prevented from being turned on. As the negative cycle progresses the current will finally start to fall towards zero level at which stage D2 will cease to conduct and Q2 will turn off. At this point the mains voltage will be at a voltage greater than zero volts and if the IC output S goes high the SCR will be able to turn on and cause the contacts to open, albeit at a relatively low voltage and a voltage that is falling towards zero volts.

The combination of D3/Q1 and D2/Q2 coupled with the phase shifting effect of Rs and Cs ensures that the SCR can only turn on when the mains voltage is approaching the zero voltage level for positive and negative half cycles of the mains supply. The successive periods during which Q1 and Q2 are both turned off are referred to herein as solenoid activation windows. If the IC output S goes high during such a window the SCR will be turned on and the contacts M will open at a relatively low and reducing voltage level. The solenoid activation windows for several cycles of the mains supply are shown hatched in FIG. 3. It can be seen that the windows do not extend right up to the zero crossing points of the waveforms. Recalling that the current will be leading the mains voltage at all times it follows that towards the end of the positive half cycle Q2 will be turned on via D2 and thereby clamp the SCR gate, and towards the end of the negative half cycle Q1 will be turned on via D3 and thereby clamp the SCR gate.

Under this arrangement, turn on of the SCR during the positive or negative half cycle of the mains supply can only occur in the solenoid activation windows, as the magnitude of the mains voltage is falling towards zero, with the result that the load and fault currents will also be falling. The solenoid will therefore be energised and the contacts will open on to a reducing fault current which will be substantially less than the current that would flow if the SCR was turned on at the peak of the half cycle. As a result, the breaking voltage, current and energy will all be substantially less than would be the case at voltage levels greater than those pertaining during the window periods, and arcing, heat and debris will consequently be less.

The width of the activation windows can be set by optimising the choice of the values of Cs and Rs with the result that the point on wave at which the contacts are able to open can be controlled or synchronised in such a way as to minimise the stress on the contacts.

The circuit of FIG. 2 uses a capacitor-activated solenoid. The embodiment of FIG. 4 shows an example of the circuit using a mains-operated solenoid.

Figure 3:
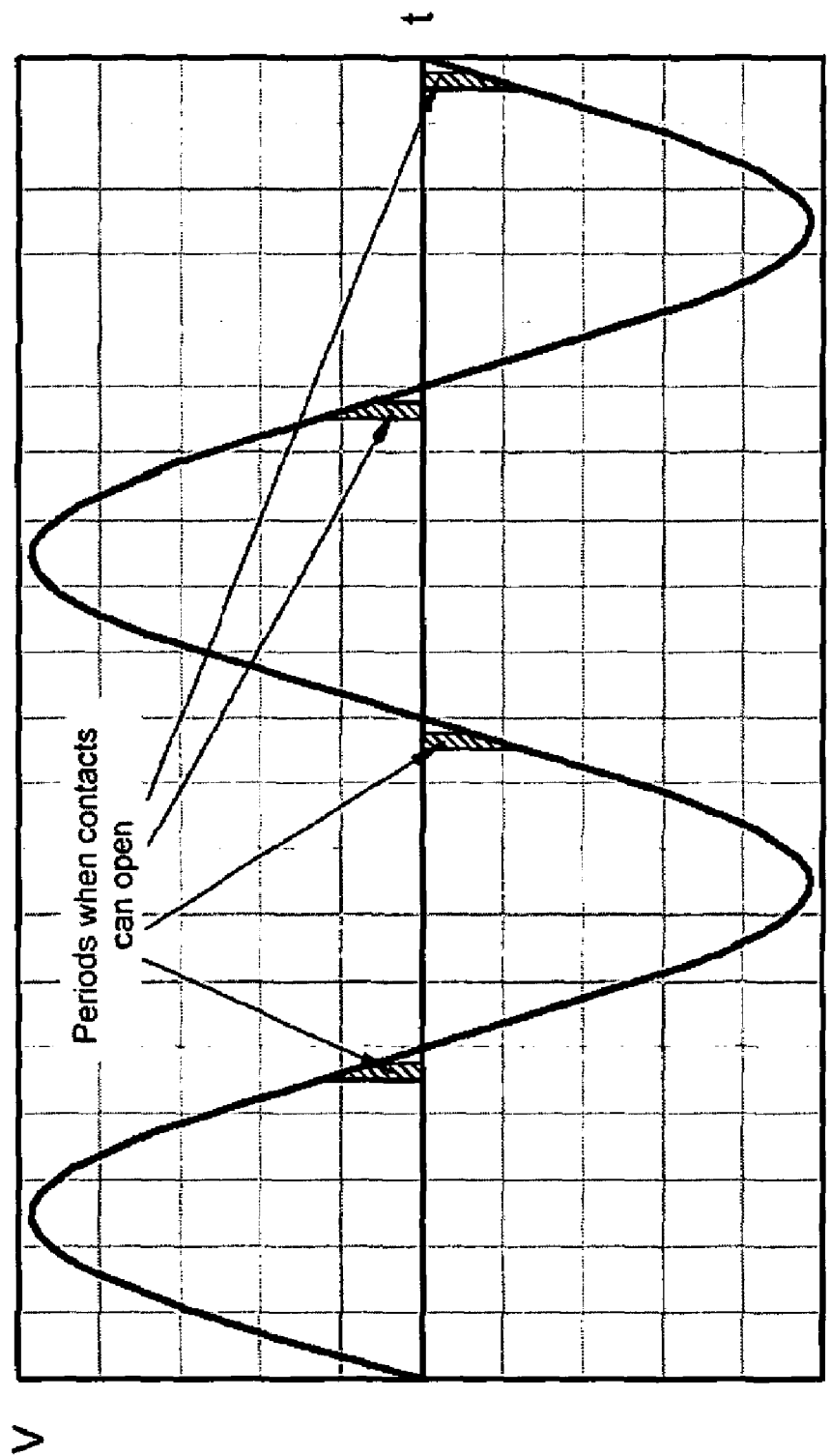
FIG. 3 is a waveform diagram illustrating the operation of the circuit of FIG. 2.
Figure 4:
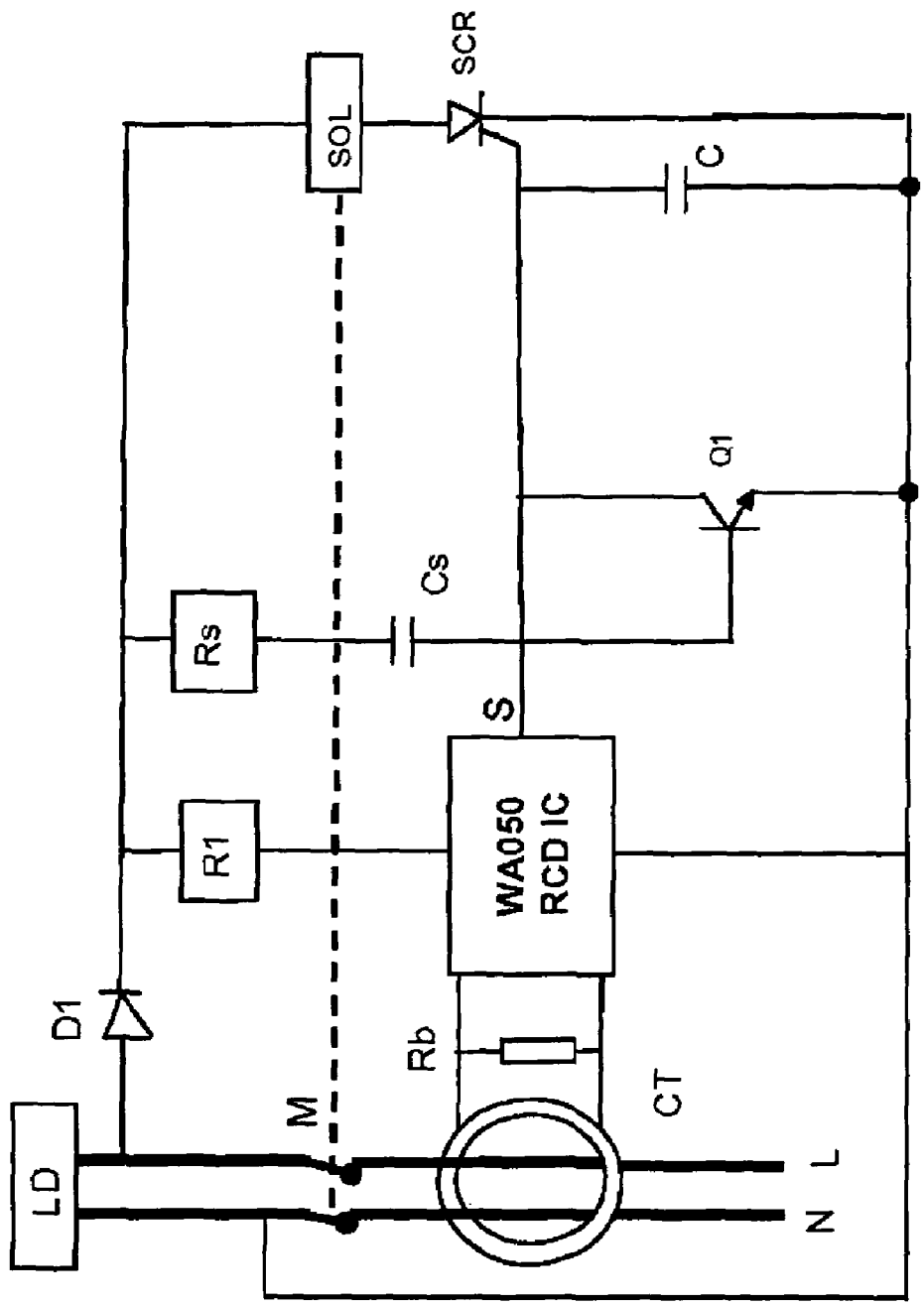
FIG. 4 shows an RCD circuit according to a second embodiment of the invention.

In the arrangement of FIG. 4, D2, D3 and Q2 have been eliminated because the SCR can only turn on during positive half cycles of the mains supply because of D1, and the negative half cycles of the mains supply can be disregarded. Considering the positive half cycles of the mains voltage as shown in FIG. 3, there is a small region between the activation window and the zero crossover wherein there is a positive voltage on the SCR anode, and in this region Q1 will be turned off because its base current will be too low to keep it turned on. In theory the SCR could turn on in this region if the WA050 output went high. This would not be a problem in practice because turn on would occur under the desired conditions of a low or reducing mains voltage level. However, the magnitude of mains voltage that would be applied to the solenoid if the SCR was to turn on in this region would be very low and unlikely to cause activation of the solenoid once below a certain level. Non actuation of the solenoid in this region could be assured by appropriate design of the solenoid. An important requirement of this arrangement is that the solenoid must have sufficient energy at the activation window voltage to ensure its reliable operation and opening of the contacts. By suitable manipulation of the values of Cs and Rs the solenoid activation window can be widened with the result that the SCR can turn on at a higher mains voltage if required and thereby ensure reliable operation of the solenoid.

If the SCR in FIG. 4 were supplied via a full wave bridge rectifier instead of via the diode D1, it would be able to conduct during both positive and negative half cycles of the mains supply. In this case, Q1 would turn off slightly before each zero crossover, and if the IC output were high the SCR could energise the solenoid and cause the contacts to open. As for the previous embodiment, the contacts would open when the mains voltage and resultant load or fault current magnitudes were falling, with resultant stress on the contacts being reduced.

Figure 5:
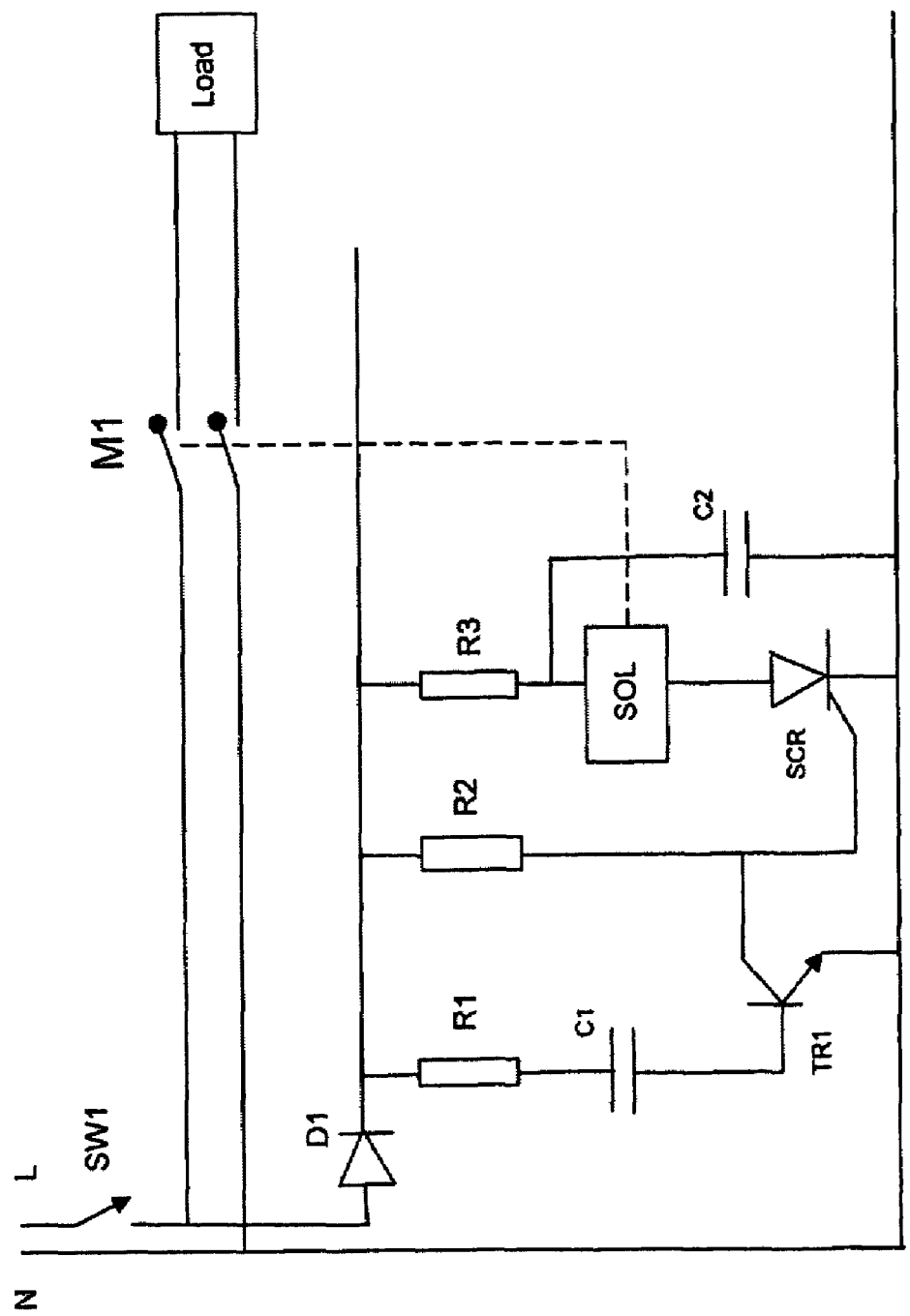
FIG. 5 shows a circuit according to a third embodiment of the invention.

Although the foregoing has described embodiments for controlling the point at which contacts open in an AC electrical supply to minimise arcing during such opening, the principles are readily adapted for addressing this problem for closing contacts. A basic circuit is shown in FIG. 5.

The circuit is supplied from the L and N conductors via a manually operable switch SW1. When SW1 is closed, a transistor TR1 is turned on via a resistor R1 and a capacitor C1, and is held turned on for most of each positive mains half cycle. Thus the control input of the SCR is tied to ground and cannot turn on. However, due to the phase shifting effect of R1 and C1, as described previously for Rs and Cs, TR1 is turned off for a short period just before the end of each positive half cycle. Within this activation window the SCR can be turned on via a resistor R2 so that current flows though the solenoid SOL to close the contacts M1.

The solenoid SOL and a reservoir capacitor C2 are supplied via a resistor R3 such that on positive half cycles SOL is energised, and hence the contacts M1 held closed, by the current flow through R3, while during negative half cycles SOL is energised, and hence the contacts M1 likewise held closed, by the current flow from C2.

The principles of the point on wave circuit described above can be used in electronic RCDs, circuit breakers, relays, contactors, and other switching devices, and can be used to determine the point on wave at which contacts close or open.

The invention is not limited to the embodiments described herein which may be modified or varied without departing from the scope of the invention.

The invention claimed is:

1. A switching circuit comprising at least one pair of mechanical contacts in an alternating current electricity supply and means for changing the state of the contacts in response to a switching signal, the circuit further including means for defining, in successive cycles of the electricity supply, periods of time ("activation windows") during which the magnitude of the supply voltage is not at a maximum and allowing the contacts to change state in response to a switching signal only during such windows, wherein the activation windows are defined by a signal derived by phase shifting the supply voltage and occur when the supply voltage is less than a maximum and reducing towards zero, said signal releasing a clamp on the output of the switching signal which clamp prevents the switching signal appearing outside the activation windows.

2. A switching circuit as claimed in claim 1, including a solid state switching device which is turned on in response to a switching signal of a given voltage level applied at a control terminal of the switching device, wherein the means for defining the activation windows comprises means for holding the control terminal to a voltage other than the given voltage level outside the activation windows, and wherein the contacts change state in response to the switching device being turned on.

3. A switching circuit as claimed in claim 2, wherein the means for holding the control terminal to a voltage other than said given voltage level comprises a further solid state switching device connected between the control terminal and the voltage other than the given voltage, the further solid state switching device being turned on outside the activation windows.

4. A switching circuit as claimed in claim 1, wherein the switching circuit is a residual current device and the switching signal is produced in response to an earth fault current.

* * * * *